Patented Jan. 28, 1941

2,229,652

UNITED STATES PATENT OFFICE 2,229,652

PROCESS FOR PRODUCING BUTADIENE

Paul Halbig, Munich, Norbert Platzer, Burghausen, and Alfred Treibs, Munich, Germany, assignors to Consortium für Elektrochemische Industrie G. m. b. H., Munich, Germany, a corporation of Germany No Drawing. Application January 13, 1939, Serial No. 250,736. In Germany February 9, 1938

4 Claims. (Cl. 260—681)

This invention relates to the production of butadiene and has for its object to provide an efficient, economical process for this purpose.

We have found that 1,3-butylene-glycol and its ether, $$CH_3-CHOH-CH_2-CH_2-$$
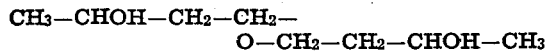
$$O-CH_2-CH_2-CHOH-CH_3$$

in liquid phase may be dissociated to butadiene with good results at low temperatures.

In order to obtain the best yields it is necessary to effect the dissociation in the presence of a substantial amount of water and to remove the butadiene from the reaction system immediately upon its formation. Suitable catalysts are dehydration media such as sulphuric acid, its acid salts, sulfo-acids, phosphoric acid, perchloric acid, etc., and mixtures of these compounds. The reaction temperature depends on the type of catalyst and its concentration. The reaction may be performed at temperatures around 200° C. with 1% sulphuric acid. With stronger sulphuric acid the reaction begins around 140° C.

The reaction is explained in the following example.

Example 80 parts 1,3-butylene-glycol are dissolved in 20 parts water. This solution is added at the rate of about 800 parts per hour to 2000 parts of 1% sulphuric acid which are boiling at about 200° C. in a pressure vessel. The dissociation of the butylene-glycol begins immediately. The generated butadiene is drawn off as it generates, while the reaction products with higher boiling points are retained by a cooler, while at the same time with the aid of a separator as much water is drawn off as is formed by the reaction. In this manner a great quantity of glycol may be converted in the apparatus, as long as the effectiveness of the sulphuric acid is retained; this acid lasts a very long time, since $SO_2$ and other sulphur-containing dissociation products are not generated in appreciable amounts. The yield of butadiene is about 80% theory.

The same result is obtained by using the ether of the formula $$CH_3-CHOH-CH_2-CH_2-$$
$$O-CH_2-CH_2-CHOH-CH_3$$

or mixtures of said ether and the glycol, in aqueous solution.

The reaction in the presence of potassium bisulphate, toluol-sulfo acid, aluminium sulphate, alum and other catalysts acting as mineral acids may be performed in a similar manner.

The invention claimed is:

1. Process for producing butadiene which comprises heating a compound having the general formula $CH_3-CHOH-CH_2-CH_2OR$ in which R is a member selected from the group consisting of hydrogen, $-CH_2-CH_2-CHOH-CH_3$ and mixtures of the same, and an aqueous solution of a dehydration catalyst containing water in a quantity greater than the quantity of said compound to a temperature higher than 100° C. under pressure, and removing the butadiene from the reaction zone as soon as it is formed.

2. Process for producing butadiene which comprises heating 1,3-butylene-glycol, and an aqueous solution of a dehydration catalyst containing water in a quantity greater than the quantity of said compound to a temperature higher than 100° C. under pressure, and removing the butadiene from the reaction zone as soon as it is formed.

3. Process for producing butadiene which comprises heating $$CH_3-CHOH-CH_2-CH_2-$$
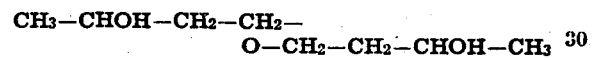
$$O-CH_2-CH_2-CHOH-CH_3$$

and an aqueous solution of a dehydration catalyst containing water in a quantity greater than the quantity of said compound to a temperature higher than 100° C. under pressure, and removing the butadiene from the reaction zone as soon as it is formed.

4. Process for producing butadiene which comprises heating 1,3-butylene-glycol and an aqueous solution of sulfuric acid containing water in a quantity greater than the quantity of 1,3-butylene-glycol to a temperature of about 140° C. to 200° C. under pressure, and removing the butadiene from the reaction zone as soon as it is formed.

PAUL HALBIG.
NORBERT PLATZER.
ALFRED TREIBS.